US011219890B2

(12) United States Patent
Chen

(10) Patent No.: US 11,219,890 B2
(45) Date of Patent: Jan. 11, 2022

(54) METHOD FOR MANUFACTURING CATALYSIS REACTANT HAVING HIGH EFFICIENCY CATALYSIS FOR THERMAL REACTION

(71) Applicant: Chien-Hsing Hsiao, Taichung (TW)

(72) Inventor: Tay-Yuan Chen, Taipei (TW)

(73) Assignee: Chien-Hsing Hsiao, Taichung (TW)

( * ) Notice: Subject to any disclaimer, the term of this patent is extended or adjusted under 35 U.S.C. 154(b) by 49 days.

(21) Appl. No.: 16/861,239

(22) Filed: Apr. 29, 2020

(65) Prior Publication Data

US 2021/0339238 A1   Nov. 4, 2021

(51) Int. Cl.

| B01J 37/02 | (2006.01) |
|---|---|
| B01J 37/00 | (2006.01) |
| B01J 37/06 | (2006.01) |
| B01J 35/00 | (2006.01) |
| B01J 21/08 | (2006.01) |
| B01J 21/04 | (2006.01) |
| B01J 21/06 | (2006.01) |
| B01J 27/224 | (2006.01) |
| B01J 27/24 | (2006.01) |

(52) U.S. Cl.
CPC ........... *B01J 37/0244* (2013.01); *B01J 21/04* (2013.01); *B01J 21/063* (2013.01); *B01J 21/066* (2013.01); *B01J 21/08* (2013.01); *B01J 27/224* (2013.01); *B01J 27/24* (2013.01); *B01J 35/0013* (2013.01); *B01J 37/0063* (2013.01); *B01J 37/0217* (2013.01); *B01J 37/0219* (2013.01); *B01J 37/0228* (2013.01); *B01J 37/0236* (2013.01); *B01J 37/06* (2013.01)

(58) Field of Classification Search
CPC ........ B01J 21/04; B01J 21/063; B01J 21/066; B01J 21/08; B01J 27/224; B01J 27/24; B01J 35/0013; B01J 37/0063; B01J 37/0217; B01J 37/0219; B01J 37/0228; B01J 37/0236; B01J 37/0244; B01J 37/06
See application file for complete search history.

(56) References Cited

U.S. PATENT DOCUMENTS 9,082,524 B2 *   7/2015   Worsley ................. B01J 21/063

* cited by examiner

*Primary Examiner* — Brian A McCaig
(74) *Attorney, Agent, or Firm* — Leong C. Lei

(57) ABSTRACT

A method for manufacturing a catalysis reactant having high efficiency catalysis for thermal reaction primarily includes: preparing a three-dimensional catalysis carrier; preparing at least one aqueous-phase nanometer metallic particle solution; soaking the catalysis carrier in a methanol solution containing a silane group compound and removing and subjecting the catalysis carrier to drying and freezing for surface modification; soaking the catalysis carrier in the aqueous-phase nanometer metallic particle solution and removing and subjecting the catalysis carrier to blow-drying to have the surface of the catalysis carrier combined with a first layer of nanometer metallic particles; soaking the catalysis carrier in a methanol solution containing 1,12-diaminododecane to carry out surface modification and removing and subjecting the catalysis carrier to drying, followed by soaking in the aqueous-phase nanometer metallic particle solution and then blow-drying to have the surface of the catalysis carrier further combined with a second layer of nanometer metallic particles.

17 Claims, 3 Drawing Sheets

US 11,219,890 B2

METHOD FOR MANUFACTURING CATALYSIS REACTANT HAVING HIGH EFFICIENCY CATALYSIS FOR THERMAL REACTION

TECHNICAL FIELD OF THE INVENTION

The present invention relates to a method for manufacturing catalysis reactant having high efficiency catalysis for thermal reaction, and more particularly to a catalysis reactant that is used in a catalyzed gas phase reaction system to enhance catalytic activity for a combustion reaction of a fuel disposed in the catalyzed gas phase reaction system, wherein a catalysis carrier in a three-dimensional form and at least one aqueous-phase nanometer metallic particle solution are first prepared; the catalysis carrier is soaked in a methanol solution containing a silane group compound to carry out a surface modification operation; the catalysis carrier is soaked in the aqueous-phase nanometer metallic particle solution to make a surface of the catalysis carrier combined with and forming a first layer of nanometer metallic particle; the catalysis carrier having the first layer of nanometer metallic particle is then soaked in a methanol solution containing 1,12 diaminododecane for modification, followed by soaking in the aqueous-phase nanometer metallic particle solution to make the surface of the catalysis carrier having the first layer of nanometer metallic particle further combined with and forming a second layer of nanometer metallic particle, the last step being repeated to have the surface of the catalysis carrier having the first layer of nanometer metallic particle forming multiple layers of nanometer metallic particle, providing a catalysis reactant having multiple layers of nanometer metallic particle, wherein an inter-particle interface metal (namely support effect) helps improve catalytic activity of the combustion reaction of fuel, allowing the catalysis reactant to exhibit a lowered ignition temperature and a high oxidization efficiency.

DESCRIPTION OF THE PRIOR ART

In the modern era where business and industry are prosperous, air on which human lives rely are gradually damaging human health due to industrial waste gas and gaseous exhaust of transportation. This is generally due to harmful particulate matters suspending in atmosphere, which lead to various diseases of the respiratory system and allergy and also cause bad influence on home living quality and working efficiency. Such issues of air quality have gained attention of the world recently.

Traditional large-sized warming supply facility are provided for generating thermal energy through combustion of fuels, such as coal. A huge amount of carbon particles is generated in such a combination operation and they cause significant pollution of air, leading to continuous increase of particulate matters (such as PM2.5, of which the particle size is smaller than or equal to 2.5 micrometers) in the atmosphere. Damage to human health so caused is worldwide and is not limited to any specific area or country. All countries around the world have been devoted to solution for such issues of air pollution.

In view of the above problems, a heat supply system based on catalyzed gas phase reaction has been proposed. The heat supply system includes a reaction vessel in which a plurality of catalysis reactants are provided, so that the plurality of catalysis reactants that are heated in the reaction vessel undergo a continuous thermal reaction with a fuel and such a thermal reaction carried out with the plurality of reactants provides thermal energy that continuously heats up a liquid stored in the reaction vessel to complete the operation of the heat supply system for serving as a power source or a supply of heat or other uses, whereby heating can be realized without flaming and carbonized particles or toxicant gases generated during combustion are avoided to therefore improve air quality.

However, the catalysis reactant used in the known catalyzed gas phase reaction based heat supply system in a kind of catalysis reactant that is formed of one single layer of nanometer metallic particle that is made of one single material. As such, the known catalysis reactant must be first heated up to a relatively high temperature before it can react with fuel and thus, the oxidization efficiency is relatively low, making it hard to greatly improve the efficiency of the thermal reaction.

SUMMARY OF THE INVENTION

An objective of the present invention is to provide a method for manufacturing catalysis reactant having high efficiency catalysis for thermal reaction. The catalysis reactant according to the present invention is particularly provided for use in a catalyzed gas phase reaction system to enhance catalytic activity of a combustion reaction of a fuel d in the catalyzed gas phase reaction system. The method for manufacturing the catalysis reactant comprises the following steps:

(1) preparing catalysis carrier, in which at least one oxide is processed to make a catalysis powder, and the catalysis powder is then subjected to a particle-forming or granulation operation to form a catalysis carrier that has a three-dimensional form;

(2) preparing at least one aqueous-phase nanometer metallic particle solution;

(3) modifying surface of catalysis carrier, in which the catalysis carrier is soaked in a methanol solution containing 1-15% of silane group compound and, after a period of 1-3 hours of being kept still, the catalysis carrier is removed and then washed and cleaned with a cleaning solution, and then, the catalysis carrier is subjected to a drying operation and then transferred to a refrigeration operation;

(4) catalysis carrier surface combining with first layer of nanometer metallic particle, in which the catalysis carrier that has completed surface modification is soaked in the aqueous-phase nanometer metallic particle solution prepared above and, after a period of 1-3 hours of being kept still, the catalysis carrier is removed and then washed and cleaned with a cleaning solution, and then, the catalysis carrier is subjected to blow-drying such that the catalysis carrier is provided with a surface thereof combined with and forming a first layer of nanometer metallic particle; and (5) catalysis carrier surface further combining with multiple layers of nanometer metallic particle, in which the catalysis carrier that has the surface thereof combined with the first layer of nanometer metallic particle is soaked in a methanol solution containing 3-25% of 1,12-diaminododecane for being subjected to modification, and the catalysis carrier that includes the first layer of nanometer metallic particle combined therewith and has been subjected to the modification is removed and subjected to a drying operation, and is then further soaked in the aqueous-phase nanometer metallic particle solution prepared above and after a period of 1-3 hours of being kept still, the catalysis carrier that includes the first layer of nanometer metallic particle combined therewith is removed and then washed and cleaned with a cleaning solution, and then, the catalysis carrier that includes the first layer of nanometer metallic particle combined therewith is subjected to blow-drying such that the catalysis carrier that includes the first layer of nanometer metallic particle combined therewith is further provided with the surface thereof combined with and forming a second layer of nanometer metallic particle.

The feature of the present invention is that a methanol solution containing 1,12-diaminododecane is used to carry out modification of a catalysis carrier that includes a first layer of nanometer metallic particle combined therewith, followed by soaking in a aqueous-phase nanometer metallic particle solution having identical or different metallic materials to make the surface of the catalysis carrier that includes the first layer of nanometer metallic particle thereon further combined with and forming a second layer of nanometer metallic particle. In this way, this step may be repeated to have the surface of the catalysis carrier that includes the first layer of nanometer metallic particle form multiple layers of one single constituent (or multiple layers of multiple compounded constituents) of nanometer metallic particle to achieve that a catalysis reactant having multiple layers of nanometer metallic particle may make use of inter-particle interface metal (namely support effect) to improve catalytic activity of a combustion reaction of fuel, allowing the catalysis reactant to exhibit a lowered ignition temperature and high oxidization efficiency.

DETAILED DESCRIPTION OF THE PREFERRED EMBODIMENT

Figure 1:
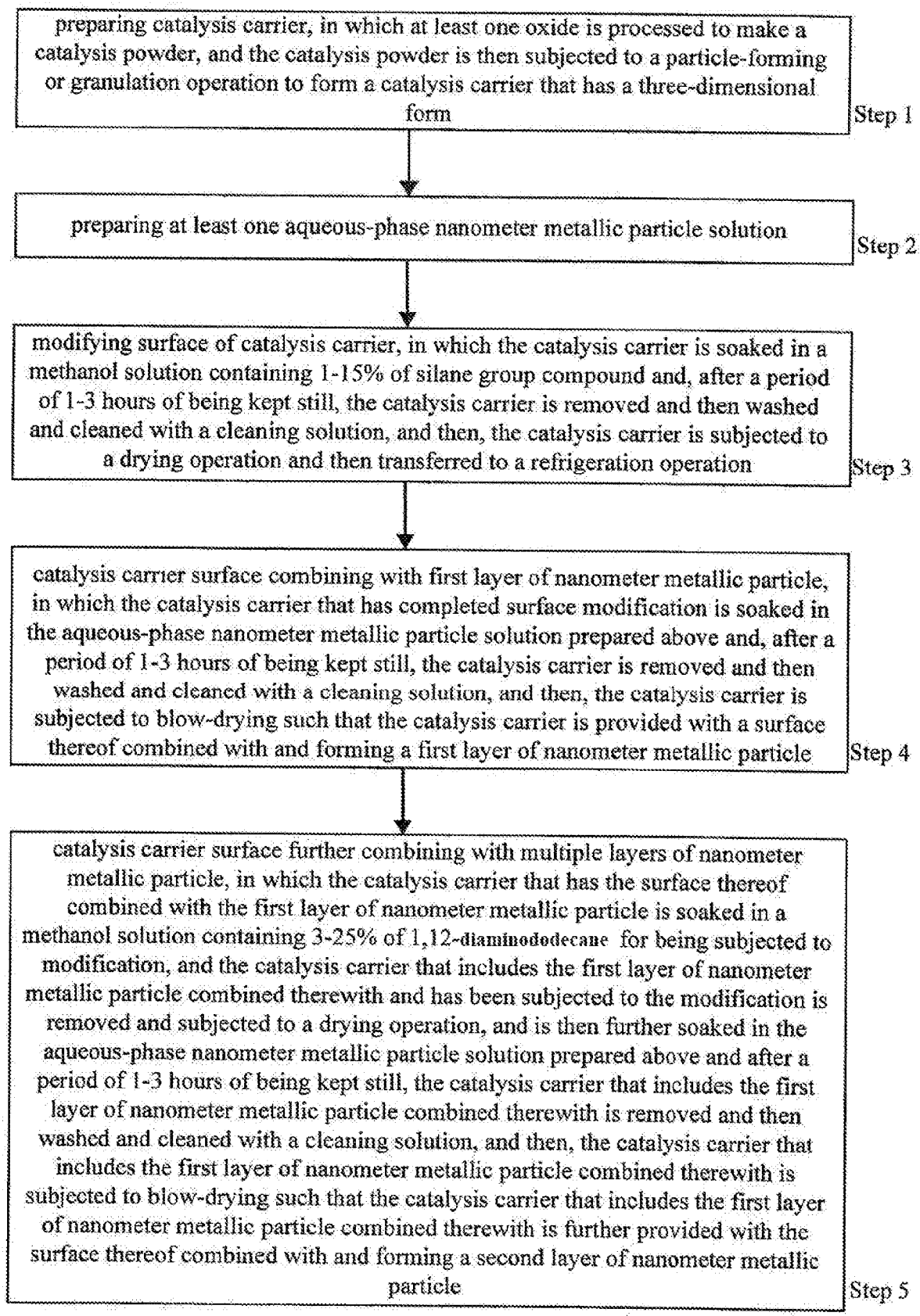
FIG. 1 is a flow chart showing a method for manufacturing catalysis reactant having high efficiency catalysis for thermal reaction according to the present invention.
Figure 2:
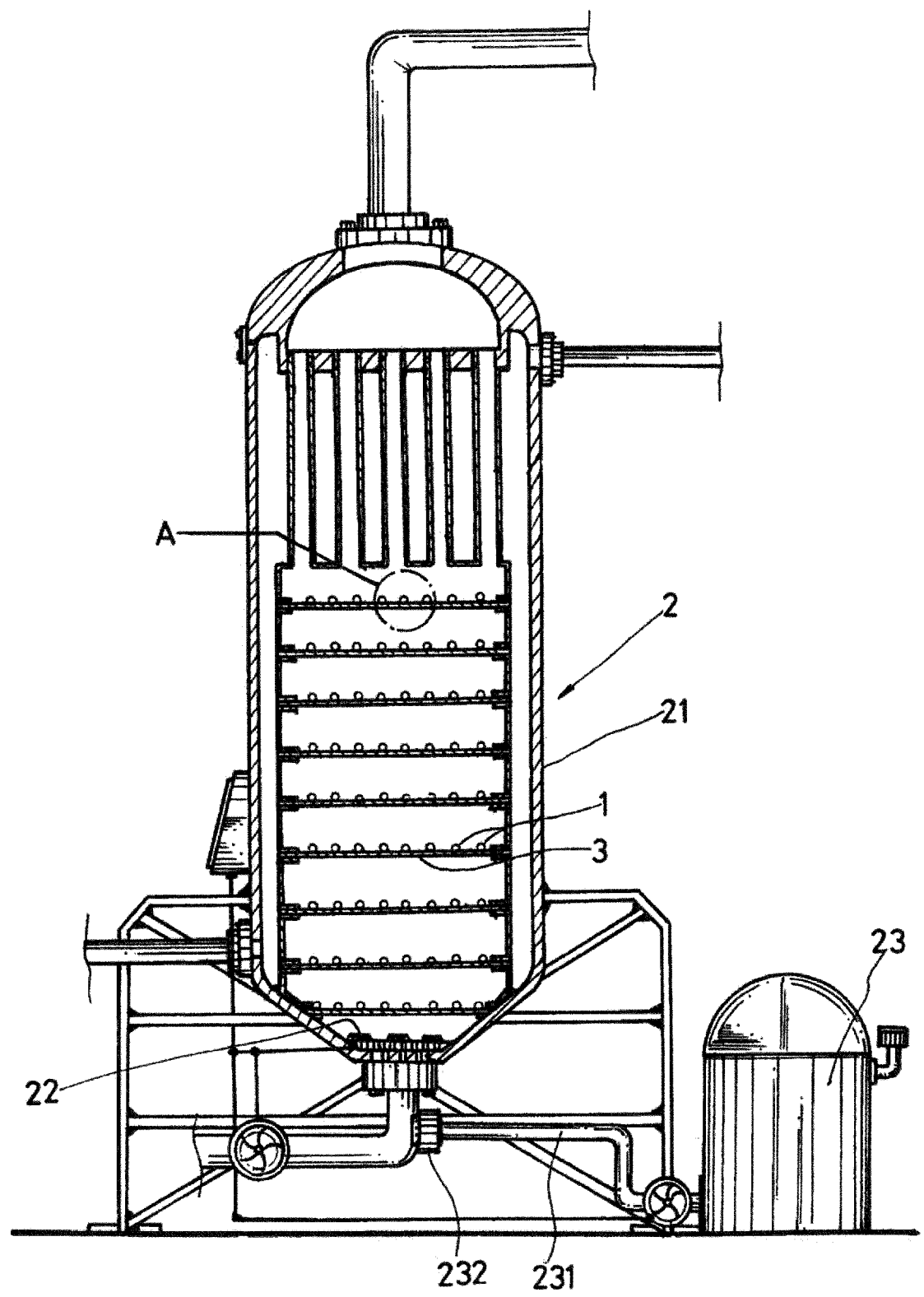
FIG. 2 is a cross-sectional view showing an example of a catalyzed gas phase reaction system according to the present invention.
Figure 3:
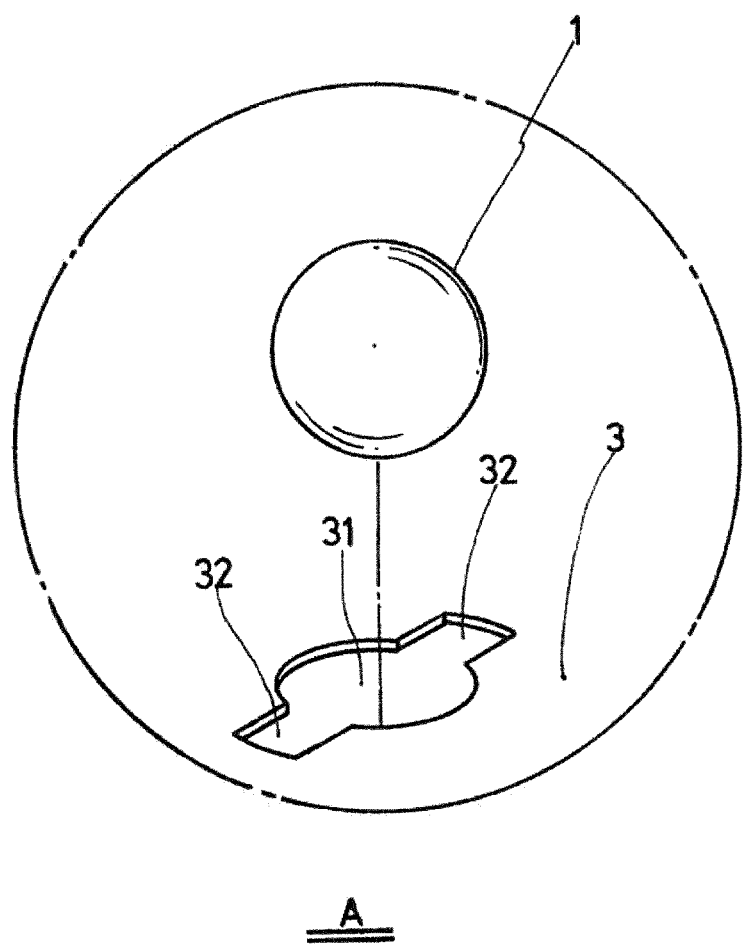
FIG. 3 is an enlarged view showing a circled part A of FIG. 2.

Referring to FIGS. 1, 2, and 3, the present invention discloses a method for manufacturing a catalysis reactant having high efficiency catalysis for thermal reaction. A catalysis reactant 1, as used herein, is particularly referred to one that is used in a catalyzed gas phase reaction system 2 to enhance catalytic activity of a combustion reaction of a fuel disposed in the catalyzed gas phase reaction system 2. The method for manufacturing the catalysis reactant 1 comprises the following steps:

Step 1: preparing catalysis carrier, in which at least one oxide is processed to make a catalysis powder, and the catalysis powder is then subjected to a particle-forming or granulation operation to form a catalysis carrier that has a three-dimensional form (such as a sphere, a column, a cube, and a cuboid, or other three-dimensional shape). The oxide can be an oxide of one of silicon dioxide, aluminum (III) oxide, titanium dioxide, zirconium dioxide, silicon carbide, and aluminum nitride or a combination (composite) of more than one thereof.

Step 2: preparing at least one aqueous-phase nanometer metallic particle solution, in which a material of a nanometer metallic particle contained in the aqueous-phase nanometer metallic particle solution is gold, silver, palladium, rhodium, ruthenium, or iridium, or other metallic materials; and, alternatively, Step 2 is provided for preparing an aqueous-phase nanometer metallic particle solution containing two or more than two different nanometer metallic materials.

Step 3: modifying surface of catalysis carrier, in which the catalysis carrier prepared in Step 1 is soaked in a methanol solution containing 1-15% of silane group compound and, after a period of 1-3 hours of being kept still, the catalysis carrier is removed and then washed and cleaned with a cleaning solution, and then, the catalysis carrier is subjected to a drying operation and then transferred to a refrigeration operation. The silane group compound can be (3-aminopropyl)trimethoxysilane (APTMS), (3-mercaptopropyl) trimethoxysilane (MPTMS), or (mercaptomethyl-dimethylethoxy silane, (MMDMES). The cleaning solution is ionized water or alcohol. The drying operation is such that the catalysis carrier that has been washed and cleaned is placed in a drying oven at a temperature of 80° C.-90° C. for 20-40 minutes and is then removed and set in room temperature for cooling. The refrigeration operation is such that the catalysis carrier that has been subjected to the drying operation is placed in a nitrogen-filled test tube and disposed in a refrigerator for refrigeration.

Step 4: catalysis carrier surface combining with first layer of nanometer metallic particle, in which the catalysis carrier that has completed surface modification is soaked in the aqueous-phase nanometer metallic particle solution prepared in Step 2 and, after a period of 1-3 hours of being kept still, the catalysis carrier is removed and then washed and cleaned with a cleaning solution, and then, the catalysis carrier is subjected to blow-drying such that the catalysis carrier is provided with a surface thereof combined with and forming a first layer of nanometer metallic particle. The cleaning solution is ionized water or alcohol. The catalysis carrier that has been washed and cleaned is then subjected to blow-drying with nitrogen gas.

Step 5: catalysis carrier surface further combining with multiple layers of nanometer metallic particle, in which the catalysis carrier that has the surface thereof combined with the first layer of nanometer metallic particle is soaked in a methanol solution containing 3-25% of 1,12-diaminododecane (1,12 DDCA) for being subjected to modification, and the catalysis carrier that includes the first layer of nanometer metallic particle combined therewith and has been subjected to the modification is removed and subjected to a drying operation, and is then further soaked in the aqueous-phase nanometer metallic particle solution prepared in Step 2 and after a period of 1-3 hours of being kept still, the catalysis carrier that includes the first layer of nanometer metallic particle combined therewith is removed and then washed and cleaned with a cleaning solution, and then, the catalysis carrier that includes the first layer of nanometer metallic particle combined therewith is subjected to blow-drying such that the catalysis carrier that includes the first layer of nanometer metallic particle combined therewith is further provided with the surface thereof combined with and forming a second layer of nanometer metallic particle. The drying operation executed in Step 5 is such that the catalysis carrier that includes the first layer of nanometer metallic particle combined therewith is placed in a test tube and disposed in a drying oven at a temperature of 80° C. -90° C. to perform the drying operation. The cleaning solution is ionized water or alcohol. The catalysis carrier that has been washed and cleaned is subjected to the blow-drying with nitrogen gas.

Further, in an alternative, the present invention includes a step of repeating Step 5, in which the catalysis carrier that has already been provided with the second layer of nanometer metallic particle is further provided with multiple layers (such as a third layer, a fourth layer, and so on) of nanometer metallic particle on the surface thereof. Further, for each of Step 3 and Step 5, the aqueous-phase nanometer metallic particle solution used in such steps may include an identical metallic particle material or different metallic particle materials, so that the materials of the metallic particles contained in the layers of nanometer metallic particle of the catalysis carrier can be all identical, partly identical, or totally different from each other to make the surface of the catalysis carrier that includes the first layer and/or other layers of nanometer metallic particle form multiple layers of one single constituent (or multiple compounded constituents) of nanometer metallic particle. For example, the materials of the nanometer metallic particle for the first and second (or multiple) layers of the catalysis carrier can both be nanometer gold particles; the material of nanometer metallic particle for the first layer of the catalysis carrier can all be nanometer gold particles and the materials of the nanometer metallic particles for the second layer (and other layers) can be nanometer platinum particles; the material of nanometer metallic particle for the first layer of the catalysis carrier can be nanometer gold particles and the material of the nanometer metallic particle for the second layer can be nanometer platinum particles, and the materials of the nanometer metallic particle for the other layers can be nanometer silver particles (or nanometer metallic particles of other materials).

The catalysis reactant 1 that has been completed Step 5 is disposed in a disposition tray 3. The disposition tray 3 is provided with a plurality of carrying receptacles 31 that are arranged and lined up at fixed or regular intervals. Each of the carrying receptacles 31 is provided, on a periphery thereof, with at least one through opening 32, and the through opening 32 is in communication with the carrying receptacles 31. As such, a plurality of ones of the catalysis reactant 1 are respectively set in the carrying receptacles 31 of the disposition tray 3, such that the plurality of catalysis reactants 1 are arranged to be spaced from each other at fixed intervals.

The disposition tray 3 is disposed in a reaction vessel 21 included in the catalyzed gas phase reaction system 2. A heater 22 arranged in the reaction vessel 21 carries out heating of the catalysis reactants 1 first. When the catalysis reactants 1 reach a preset temperature, the heater 22 is shut down. At this moment, a fuel (such as methanol, ethanol, isopropanol, methane, or other fuels) contained in the fuel tank 23 is supplied through a fuel pipe 231 and an atomizer 232 to allow the atomizer 232 to atomize and spray the fuel into the reaction vessel 21, such that the fuel sprayed from the atomizer 232 may penetrate through the through opening 32 provided for each of the carrying receptacles 31 to make the fuel uniformly distribute in each of the catalysis reactants 1, and the plurality of catalysis reactants 1 all react with the fuel to achieve a bettered and continuous thermal reaction.

Thus, the feature of the present invention is that a methanol solution containing 1,12-diaminododecane (1,12 DDCA) is used to carry out modification of a catalysis carrier that includes a first layer of nanometer metallic particle combined therewith, followed by soaking in a aqueous-phase nanometer metallic particle solution having identical or different metallic materials to make the surface of the catalysis carrier that includes the first layer of nanometer metallic particle thereon further combined with and forming a second layer of nanometer metallic particle. In this way, this step may be repeated to have the surface of the catalysis carrier that includes the first layer of nanometer metallic particle form multiple layers of one single constituent (or multiple layers of multiple compounded constituents) of nanometer metallic particle to achieve that a catalysis reactant having multiple layers of nanometer metallic particle may make use of inter-particle interface metal (namely support effect) to improve catalytic activity of a combustion reaction of fuel, allowing the catalysis reactant to exhibit a lowered ignition temperature and a high oxidization efficiency. Further, the catalysis reactant 1 that includes multiple kinds of nanometer metallic particle provides a bettered catalysis performance for thermal reactions, and the catalysis reactant 1 having multiple kinds of nanometer metallic particle shows better thermal stability and thermal reaction efficiency than a reactant having just one kind of nanometer metallic particle.

I claim:

1. A method for manufacturing a catalysis reactant having high efficiency catalysis for a thermal reaction, the catalysis reactant being provided for use in a catalyzed gas phase reaction system to enhance catalytic activity of a combustion reaction of a fuel in the catalyzed gas phase reaction system, the method for manufacturing the catalysis reactant comprising the following steps:

(1) preparing catalysis carrier, in which at least one oxide is processed to make a catalysis powder, and the catalysis powder is then subjected to form a catalysis carrier that has a three-dimensional form;

(2) preparing at least one aqueous-phase nanometer metallic particle solution;

(3) modifying surface of catalysis carrier, in which the catalysis carrier is soaked in a methanol solution containing a silane group compound and, after a period of 1-3 hours of being kept still, the catalysis carrier is removed and then washed and cleaned with a cleaning solution, and then, the catalysis carrier is subjected to a drying operation and then transferred to a refrigeration operation;

(4) catalysis carrier surface combining with first layer of nanometer metallic particle, in which the catalysis carrier that has completed surface modification is soaked in the aqueous-phase nanometer metallic particle solution prepared above and, after a period of 1-3 hours of being kept still, the catalysis carrier is removed and then washed and cleaned with a cleaning solution, and then, the catalysis carrier is subjected to blow-drying such that the catalysis carrier is provided with a surface forming a first layer of nanometer metallic particle; and (5) catalysis carrier surface further combining with multiple layers of nanometer metallic particle, in which the catalysis carrier that has the surface thereof combined with the first layer of nanometer metallic particle is soaked in a methanol solution containing 1,12-diaminododecane for being subjected to modification, and the catalysis carrier that includes the first layer of nanometer metallic particle combined therewith and has been subjected to the modification is removed and subjected to a drying operation, and is then further soaked in the aqueous-phase nanometer metallic particle solution prepared above and after a period of 1-3 hours of being kept still, the catalysis carrier that includes the first layer of nanometer metallic particle combined therewith is removed and then washed and cleaned with a cleaning solution, and then, the catalysis carrier that includes the first layer of nanometer metallic particle combined therewith is subjected to blow-drying such that the catalysis carrier that includes the first layer of nanometer metallic particle combined therewith is further provided with the surface forming a second layer of nanometer metallic particle.

2. The method for manufacturing catalysis reactant having high efficiency catalysis for thermal reaction according to claim 1 further comprising a step of repeating Step 5 to provide multiple layers of nanometer metallic particle combined with and formed on the surface of the catalysis carrier that includes the second layer of nanometer metallic particle.

3. The method for manufacturing catalysis reactant having high efficiency catalysis for thermal reaction according to claim 2, wherein in the aqueous-phase nanometer metallic particle solutions of Step 3 and Step 5, the metallic particles are identical and the nanometer metallic particle of each layer of the catalysis carrier is identical.

4. The method for manufacturing catalysis reactant having high efficiency catalysis for thermal reaction according to claim 2, wherein in the aqueous-phase nanometer metallic particle solutions of Step 3 and Step 5, the metallic particles are different and the nanometer metallic particles of the layers of the catalysis carrier are different.

5. The method for manufacturing catalysis reactant having high efficiency catalysis for thermal reaction according to claim 2, wherein in the aqueous-phase nanometer metallic particle solutions of Step 3 and Step 5, the nanometer metallic particles of the layers of the catalysis carrier are partly identical and partly different.

6. The method for manufacturing catalysis reactant having high efficiency catalysis for thermal reaction according to claim 2, wherein the catalysis reactant formed in Step 5 is disposed in a disposition tray, the disposition tray comprising a plurality of carrying receptacles arranged at fixed intervals and each receiving the catalysis reactant therein, each of the carrying receptacles being provided, in a periphery, with at least one through opening, the through opening being in communication with the carrying receptacle, the catalysis reactants received in the carrying receptacles of the disposition tray being disposed at fixed intervals.

7. The method for manufacturing catalysis reactant having high efficiency catalysis for thermal reaction according to claim 2, wherein the oxide of Step 1 is selected from one of silicon dioxide, aluminum (III) oxide, titanium dioxide, zirconium dioxide or a combination of more than one thereof.

8. The method for manufacturing catalysis reactant having high efficiency catalysis for thermal reaction according to claim 2, wherein the silane group compound of Step 3 comprises one of (3-aminopropyl)trimethoxysilane (APTMS), (3-mercaptopropyl)trimethoxysilane (MPTMS), and mercaptomethyl-dimethylethoxy silane, (MMDMES).

9. The method for manufacturing catalysis reactant having high efficiency catalysis for thermal reaction according to claim 2, wherein the cleaning solution comprises one of ionized water and alcohol.

10. The method for manufacturing catalysis reactant having high efficiency catalysis for thermal reaction according to claim 2, wherein the blow drying of Step 5 is such that the catalysis carrier that includes the first layer of nanometer metallic particle combined therewith is placed in a test tube and disposed in a drying oven at a temperature of 80° C. -90° C. to perform the drying operation.

11. The method for manufacturing catalysis reactant having high efficiency catalysis for thermal reaction according to claim 1, wherein in the aqueous-phase nanometer metallic particle solutions of Step 3 and Step 5, the metallic particles are identical and the nanometer metallic particle of each layer of the catalysis carrier is identical.

12. The method for manufacturing catalysis reactant having high efficiency catalysis for thermal reaction according to claim 1, wherein in the aqueous-phase nanometer metallic particle solutions of Step 3 and Step 5, the metallic particles are different and the nanometer metallic particles of the layers of the catalysis carrier are different.

13. The method for manufacturing catalysis reactant having high efficiency catalysis for thermal reaction according to claim 1, wherein the catalysis reactant formed in Step 5 is disposed in a disposition tray, the disposition tray comprising a plurality of carrying receptacles arranged at fixed intervals and each receiving the catalysis reactant therein, each of the carrying receptacles being provided, in a periphery, with at least one through opening, the through opening being in communication with the carrying receptacle, the catalysis reactants received in the carrying receptacles of the disposition tray being disposed at fixed intervals.

14. The method for manufacturing catalysis reactant having high efficiency catalysis for thermal reaction according to claim 1, wherein the oxide of Step 1 is selected from one of silicon dioxide, aluminum (III) oxide, titanium dioxide, zirconium dioxide or a combination of more than one thereof.

15. The method for manufacturing catalysis reactant having high efficiency catalysis for thermal reaction according to claim 1, wherein the silane group compound of Step 3 comprises one of (3-aminopropyl)trimethoxysilane (APTMS), (3-mercaptopropyl)trimethoxysilane (MPTMS), and mercaptomethyl-dimethylethoxy silane, (MMDMES).

16. The method for manufacturing catalysis reactant having high efficiency catalysis for thermal reaction according to claim 1, wherein the cleaning solution comprises one of ionized water and alcohol.

17. The method for manufacturing catalysis reactant having high efficiency catalysis for thermal reaction according to claim 1, wherein the blow drying of Step 5 is such that the catalysis carrier that includes the first layer of nanometer metallic particle combined therewith is placed in a test tube and disposed in a drying oven at a temperature of 80° C. -90° C. to perform the drying operation.

\* \* \* \* \*